(12) United States Patent
Petukhov et al.

(10) Patent No.: US 8,621,278 B2
(45) Date of Patent: Dec. 31, 2013

(54) SYSTEM AND METHOD FOR AUTOMATED SOLUTION OF FUNCTIONALITY PROBLEMS IN COMPUTER SYSTEMS

(75) Inventors: Artem Petukhov, Moscow (RU); Timur Smirnov, Moscow (RU); Stephane Le Hir, Suresnes (FR); Marina Eremina, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 302 days.

(21) Appl. No.: 13/230,883

(22) Filed: Sep. 13, 2011

(65) Prior Publication Data
US 2013/0007527 A1    Jan. 3, 2013

(30) Foreign Application Priority Data

Jun. 28, 2011 (RU) .................................. 2011126341

(51) Int. Cl.
*G06F 11/00* (2006.01)
(52) U.S. Cl.
USPC ................................................................ 714/26
(58) Field of Classification Search
USPC ............................................................. 714/26
See application file for complete search history.

(56) References Cited

U.S. PATENT DOCUMENTS

| | | | |
|---|---|---|---|
| 5,893,083 A * | 4/1999 | Eshghi et al. | 706/45 |
| 7,080,287 B2 | 7/2006 | Salem | |
| 7,159,237 B2 | 1/2007 | Schneier | |
| 7,257,514 B2 * | 8/2007 | Faihe | 702/183 |
| 7,260,844 B1 | 8/2007 | Tidwell | |
| 7,461,036 B2 | 12/2008 | Genty | |
| 2002/0019945 A1 | 2/2002 | Houston | |
| 2004/0260947 A1 | 12/2004 | Brady | |
| 2005/0278213 A1 * | 12/2005 | Faihe | 705/11 |
| 2007/0094728 A1 | 4/2007 | Julisch | |
| 2007/0143843 A1 | 6/2007 | Nason | |
| 2007/0266138 A1 | 11/2007 | Spire | |
| 2008/0040299 A1 * | 2/2008 | Faihe | 706/14 |

FOREIGN PATENT DOCUMENTS

WO    WO 0125935    4/2001

* cited by examiner

*Primary Examiner* — Charles Ehne
(74) *Attorney, Agent, or Firm* — Bardmesser Law Group

(57) ABSTRACT

An automated support system includes a database of statistics used to calculate and store the solution ratings. The database is connected to a decision-making module that selects appropriate solutions. A known computer operation-related problem is stored in the database. The problem is represented by a set of parameters of a user computer system. Any given set of parameters defines a problem existing on the user(s) computer system. A solution formed by the solution adding module is represented by a special file. The selected solution is automatically executed on the user computer system and operation-related problem is solved. The effective solution is assigned rating stored in the solution database.

29 Claims, 15 Drawing Sheets

SYSTEM AND METHOD FOR AUTOMATED SOLUTION OF FUNCTIONALITY PROBLEMS IN COMPUTER SYSTEMS

CROSS-REFERENCE TO RELATED APPLICATION

This application claims priority to Russian Patent Application No. 2011126341, filed Jun. 28, 2011, which is incorporated by reference herein in its entirety.

BACKGROUND OF THE INVENTION

1. Field of the Invention

The present invention relates to system and method for providing technical support to computer users and more specifically to automatic generation of solutions for solving functional problems and correcting errors occurring in user computer systems.

2. Description of the Related Art

The level of quality and convenience of a technical support provided to users is an important factor in sale of technological or software-based products. One type of a technical support is finding solutions in a solution knowledge database without an intervention from technical support personnel or an expert.

In conventional technical support systems, typical solutions are in a form of documents in electronic format (text and/or graphical images) that are often combined in a knowledge database. These documents can be articles, reference files, user instructions, etc. Using these conventional systems, a user needs to spend a lot of time for finding the necessary information to identify and address problems. Typically, a user has to review a number of documents that may not be related to a particular product or to a particular version of the product.

Often, a user cannot guess the causes of system malfunctions, or he may not have sufficient qualifications to detect the malfunctions or damage in the system. Conventional systems analyze a state of a computer system and detect functionality problems or errors. Such systems are described, for example, in U.S. Pat. No. 6,845,474, U.S. Pat. No. 5,740,354 and in Patent publications JP2006350955A2 and JP2000322267A2. However, these systems are not able to solve the detected problems automatically.

Another type of existing systems, such as, for example, the system described in the U.S. Pat. No. 5,058,113, can detect an error in a remote computer system and fix it using known rules. However, these rules are represented by bit sequences and error detection requires a period of time during which the system remains under observation. Moreover, some of the functionality problems may not be accompanied by error reports, which considerably narrows the scope of effectiveness of such systems.

Currently, there are no systems that can detect problems, classify the problems, offer the most effective solutions for achieving positive results and automatically apply these solutions for solving the problems. The existing systems also lack the ability to generate rules and solutions that can be added by users.

Accordingly, there is a need in the art for a system and method for a faster and effective automated detection of computer functionality-related problems and restoration of correct functionality of user computer systems.

SUMMARY OF THE INVENTION

The present invention is related to a method and system for automatic detection of functionality-related computer problems and generation and application of solutions for solving these problems that substantially obviates one or several of the disadvantages of the related art.

An exemplary system for automated support of a computer system includes a server-side processor; a memory coupled to the processor; computer code loaded into the memory for: (a) a solution generation module for (i) generation and storing in a database of a solution for a category of user computer problems, (ii) finding a solution for the problem category in the database, and (iii) comparison of the solution with other solutions in the database based on a quality metric of the solution, wherein the solution generation module is connected to a solution validation module for testing the solution, and wherein the solution generation module is connected to the database, the database containing the solutions and rules; (b) the solution validation module connected to the database and adapted to test the solution for different software and hardware configurations to determine the quality metric of the solution and to store the quality metric in the database; and (c) the database containing the categories, the solutions, the quality metrics and the rules that determine which solution corresponds to which category of problems.

The system can also include a module adapted to (i) collecting configuration information from at least one user computer, the configuration information used to determine the problem category, (ii) generating a list of solutions, from the database, that correspond to the problem category and the user's configuration information, wherein the list is ordered based on ratings of the solutions, (iii) transmitting at least some of the solutions on the list to the user's computer. database includes tables of user profiles, the user profiles including the configuration information, problems that the user's computer has experienced in the past, solutions used on the user's computer and solutions added by the user.

The system can also load the user profile from the database and forms the list of solutions based on the loaded user profile. The user profile can include the following information from the user's computer: an event log, application event log files, an error log, processor state and network device state. The rating of the solution can be based on how many different problems the particular solution can be applied to. The solution validation means can have a plurality of virtual machines with different software and hardware configurations. The solution validation means executes on the user's computer and tests the solution on the hardware and software configuration of the user's computer. The quality metric can include a rating of the solution and an effectiveness of the solution.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
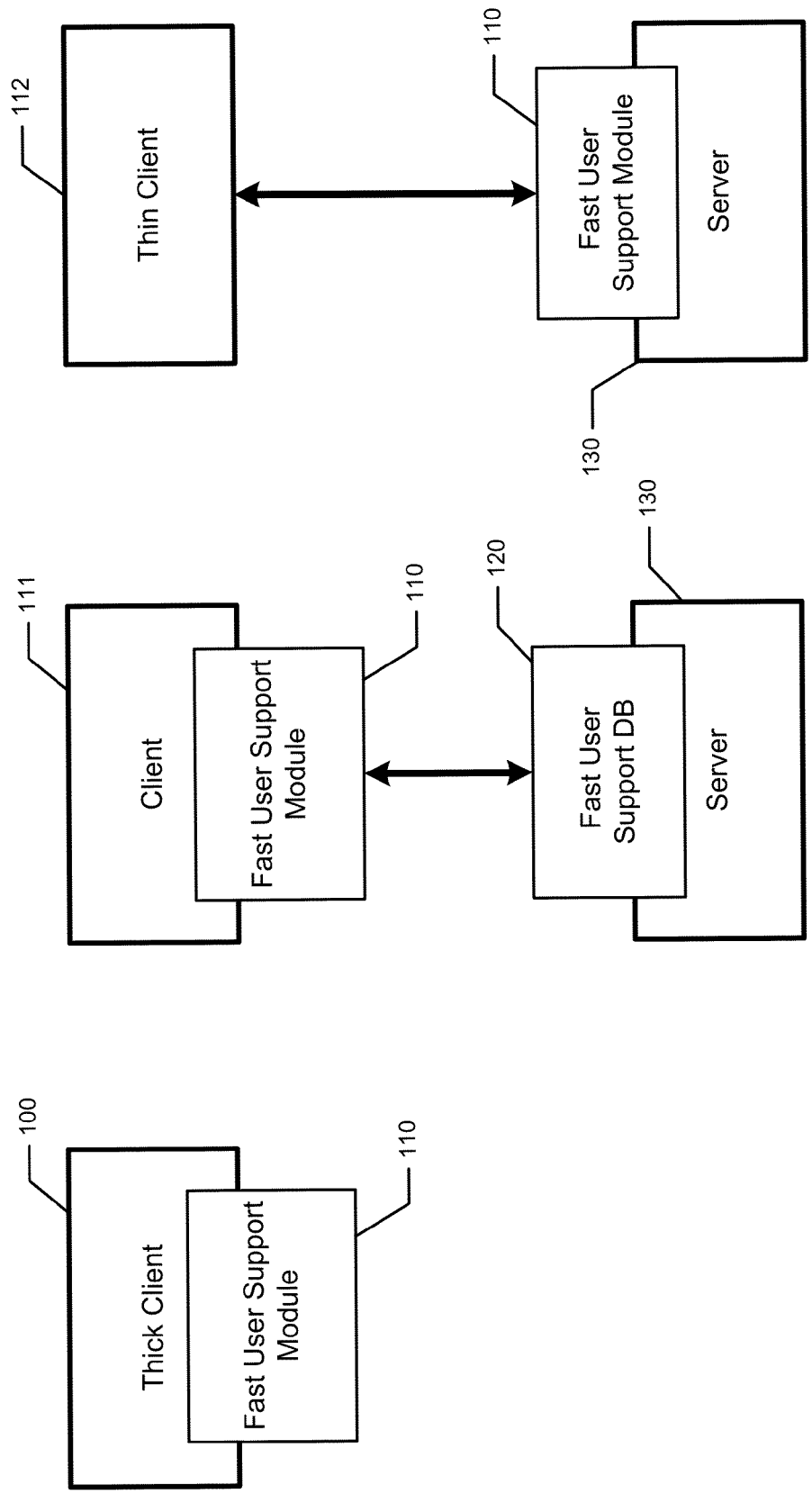
FIGS. 1A-1C illustrates different implementations of automatic technical support system, in accordance with the exemplary embodiment.

Reference will now be made in detail to the preferred embodiments of the present invention, examples of which are illustrated in the accompanying drawings.

According to the exemplary embodiment, a method and system for automatic detection of operation-related problems and for generation and execution of solutions for solving these problems on user computer systems are provided. In one embodiment, a data collection module searches for information related to a user computer system. Such information can include software and hardware configurations, user logs, application report files, error related data, state of a CPU, state of an operating memory, state of network resources, etc. The data collection module transfers the acquired data to the decision making module.

In another embodiment, the decision making module analyzes the information received from the data collection module, determines parameters (and parameter values) of the user computer system and compares them against the parameters of known problems. Thus, it determines the presence of known problems in the user computer system. Each particular problem can be characterized by a set of parameters. For example, the following information was received from the user's computer: "date of AV database update—not recent, AV error code—123". The data collection module has a solution: "update AV database if not recently updated and install patch if error code=123". The comparison can be both qualitative (some degree of similarity to known problem) or quantitative (a particular application loads the processor to 40%, when 20% is the norm, i.e., numerical values are compared.).

In yet another embodiment, the decision making module identifies new issues and creates new rules and solutions. It also creates solutions for solving existing problems by using methods based on a fuzzy logic. Alternatively, the decision making module creates solutions by using statistical methods. As an additional option, the decision making module can be implemented as an expert system.

According to the exemplary embodiment, a solution rating is calculated based statistical indicators of the effectiveness of a given solution. The higher is the number of problems solved in the user computer systems by applying the solution, the higher the rating of this solution. The decision making module sorts out the solutions based on their ratings. The solutions with higher rating are assigned a lower sequence number (i.e., an execution turn of the solution within the solution execution sequence). In other words, the most effective solutions are applied first.

The system, in accordance with the exemplary embodiment, includes a database of statistics used to calculate and to store the solution ratings. The database is connected to the decision-making module. A known problem stored in the database is represented by a set of parameters of the user computer system. Any given set of parameters precisely defines a problem existing on the user's computer system.

One of the requirements for automatic classification of the problem is a error code returned by the program (i.e., explicit characterization). The list of possible errors typically contains information about the types of problems that might be encountered, and can be the basis for the final categorization of the problem. By way of example, the following are the most popular errors for the antivirus software product:

[Activation]—Activation code is not compatible with this application. It is impossible to activate $ProductName using the activation code for another application. Please, check your product

[Licensing]—Unknown error

[Licensing]—Key file is blacklisted

[Licensing]—Databases are corrupted

[Activation]—Number of activations using this code exceeded

[Activation]—Server name cannot be resolved

[Activation]—Key file or activation code is blocked

[Activation]—Activation code is not compatible with this application. It is impossible to activate $ProductName using the activation code for another application. Please, check your product

[Licensing]—License is invalid

[Activation]—License validity period has expired

[Licensing]—Incorrect activation date

[Activation]—Proxy server is unavailable

[Activation]—Either key or activation code is blocked

[Activation]—Key creation or activation date is invalid. Check system date settings Such errors can arise not only in the application software and OS services, but also in various OS components, such as system services, drivers, etc. Information about these errors and where they arose can also be used to categorize the problem.

Since the support service can include not only the solutions to the problems, but also advice for how to use the product, the location of the support function call in the code is important for determination of the nature of the problem. For many products, it is possible to insert the function call into the code that invokes the dialog window.

For example, for Kaspersky Lab's PURE, in the dialog window "Create a backup task" it is possible to insert a FastTrack service call. If the FastTrack service was called from this point, then it is possible to say with a high degree of probability that the user is having problems with a backup task. In such a manner, it is possible to determine which particular section of the code is being executed, which is causing the problem. This increases the likelihood of a correct categorization of the problem, since the more complex the product, the more difficult it is to determine what is causing errors.

Each problem could have several possible solutions, and the conflict between applications can be identified due to an error during installation or reading of data from a disk. A solution formed by the solution adding module can be represented by an executable script file. Alternatively, the solution can be represented as a media file or as a text file. Alternatively, the solution can be a link to download a patch or an update, a script that itself executes the update, a media file (flash, video, audio) that demonstrates to the user how to implement specific actions that would resolve the problem, etc.

According to the exemplary embodiment, the solution execution module executes the solution by reproducing a text data file or a media file and by launching the executable file or executing a script from the file. The proposed system also includes a database of user profiles. The user profile database is connected to the decision-making module. The user profiles contain user-related data, user applications data, data reflecting existing and previously solved problems and data about solutions used on the user computer system.

The system, in accordance with the exemplary embodiment, includes a solution validation module connected to the solution addition module. The solution validation module validates the solutions for matching the solution against addition rules. The solution addition rules include lists of allowed and disallowed instructions. The solution addition module sends the solutions for validation in the validation module and, if no errors or disallowed instructions are detected, the solution is sent to the solution execution module. The system can also include a database of the solution validation rules. This database is connected to the solution validation module.

According to the exemplary embodiment, the system for automated resolution of computer system operation-related problems is a complex system comprising several functional modules. The exemplary system can be, advantageously, implemented on a client system or on a remote server. Alternatively, it can be distributed between client systems and a remote technical support server.

FIGS. 1A-1C illustrates different implementations of an automatic technical support system architecture, in accordance with the exemplary embodiment. FIG. 1A depicts the exemplary embodiment where an automated support module 110 is implemented on a thick client 100.

The exemplary embodiment depicted in FIG. 1A allows for supporting the client 100 and resolving operation-related problems without having to connect to the Internet. However, this arrangement has a disadvantage—the solutions can be outdated, because the solutions can only be updated when a new automated support system is installed. The solutions can be implemented as a reference file (i.e., for example, a file in ".chm" format).

FIG. 1B depicts an exemplary embodiment where an automated support functionality is distributed between the client 100 and a server 130. The fast support module 110 is implemented on a client 111. The fast support module 110 is capable of detecting and solving operation-related problems on the client 100 computer system. This distributed part of an automated support system is identical to the thick client system shown in FIG. 1A.

However, in this embodiment, a number of functions, such as, for example, solutions updates, acquiring user profiles data, adding new solutions, accessing an expanded knowledge database, etc. are available through the server 130 that has a fast customer support database 120 implemented on it. In this embodiment, the automated support can be provided to the client 111 by connecting to the server 130 over the Internet or by using local functionality of the fast support module 110.

Another arrangement for implementation of performance support tools is illustrated in FIG. 1C. The fast user support module 110 is implemented on the server 130. The fast user support module 110 supports a thin client 112. The thin client 112 accesses the fast user support module 110 through web-based applications, such as a browser. In this embodiment, the fast user support module 110 can only be used when Internet connection between the thin client 112 and the server 130 is established. Note that the system shown in FIG. 1C can have its own database. Also, note that data can be stored in any number of formats—e.g., a database, a file, etc.

The automated support system depicted in FIG. 1C provides significant advantages. It allows maintaining the thin client 112 without having to install the fast user support module 110 on the client 112. This arrangement reduces computational overhead on the client 112 while all support functionality remains the same as in the system depicted in FIG. 1B. An exemplary implementation of the architecture depicted in FIG. 1C can be in a form of a technical support web page(s). Note that some or all of the modules shown in FIGS. 1A-1C can have their own databases (not shown).

Figure 2:
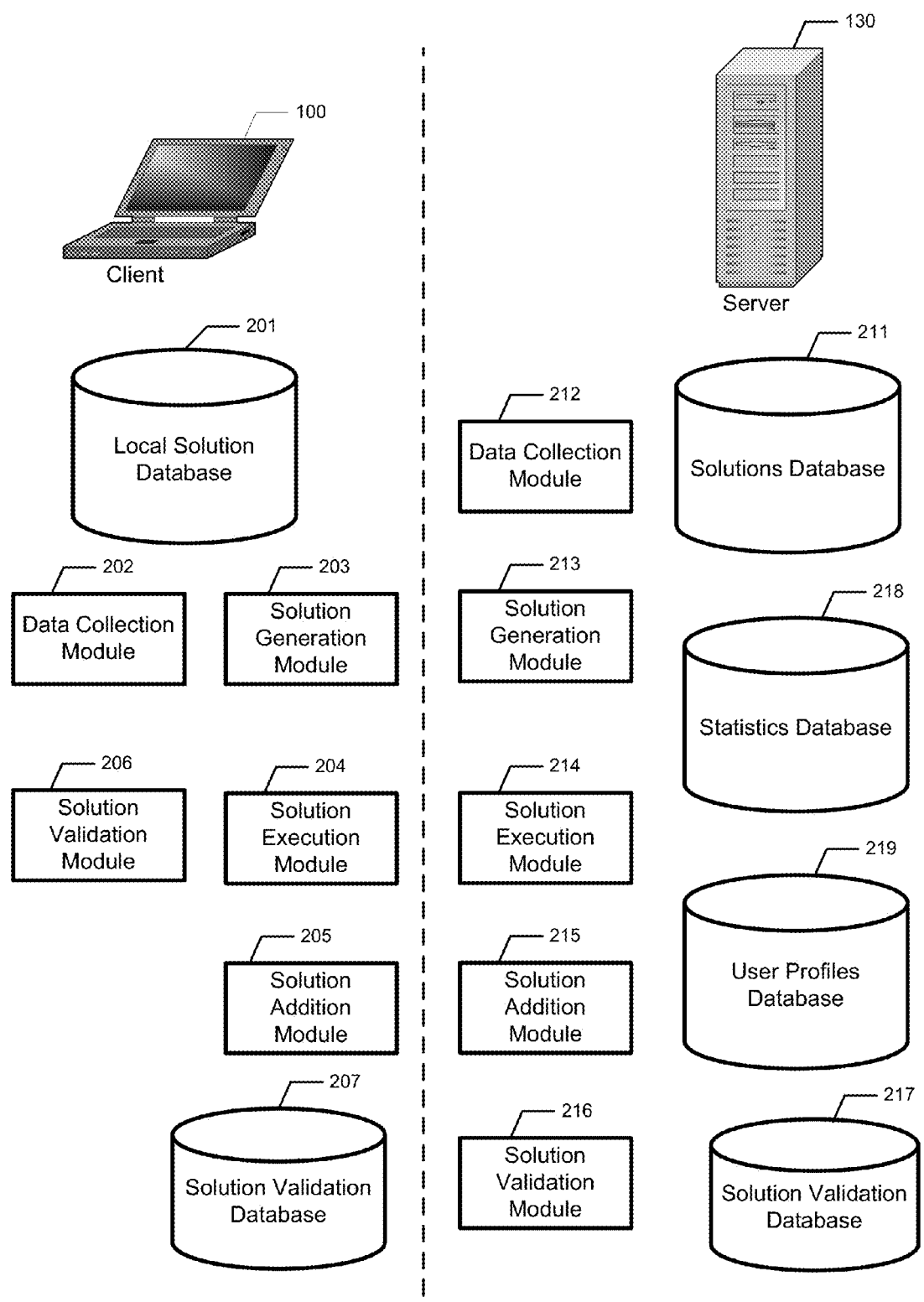
FIG. 2 illustrates use of components for implementing the support system on a server and on a user PC, in accordance with the exemplary embodiment.

FIG. 2 illustrates use of components for implementing the support and solution generation system on a server and on a user PC, in accordance with the exemplary embodiment. When a full support means of the fast support module are implemented on the client 100, the following components are installed: a local solutions database 201, a data collection module 202, a solution generation module (i.e., a decision-making tool) 203, a solution execution module 204, a solution addition module 205, a solution validation module 206 and a solution validation database 207 containing validation rules.

In the exemplary embodiment that includes a server, some functions are added and/or maintained on the server 130. The fast support system is implemented using the following components: a solutions database 211, a data collection module 212, a solution generation module (i.e., a decision-making tool) 213, a solution execution module 214, a module for generation of new solutions 215, a solution validation module 216 and a solution validation database 217, a solution statistics database 218 and a user profiles database 219, and a module for testing of the solutions 220. The statistics database can store all the characteristics of the solutions, generated through application of each solution. For example, it can store the number of times the solution was used, the number of effective applications of the solution, number of uses based on geographic regions where the solution was used, and so on.

Note that some system features depicted in FIG. 2 are duplicated on the client 100 and on the server 130, but function of the components can vary. The server 130 has a large volume of computational resources and it is capable of storing more information and process the information by employing more complex algorithms.

As an example, consider the server-side solutions database 211 and the local solutions database 201. Both databases are functionally the same. They store problems, solutions and rules for selecting the solutions. However, the server-side database 211 is capable of storing and processing much larger volumes of data that can be used by multiple clients systems, while the local database 201 only contains information for a particular version of a user system.

Figure 3A:
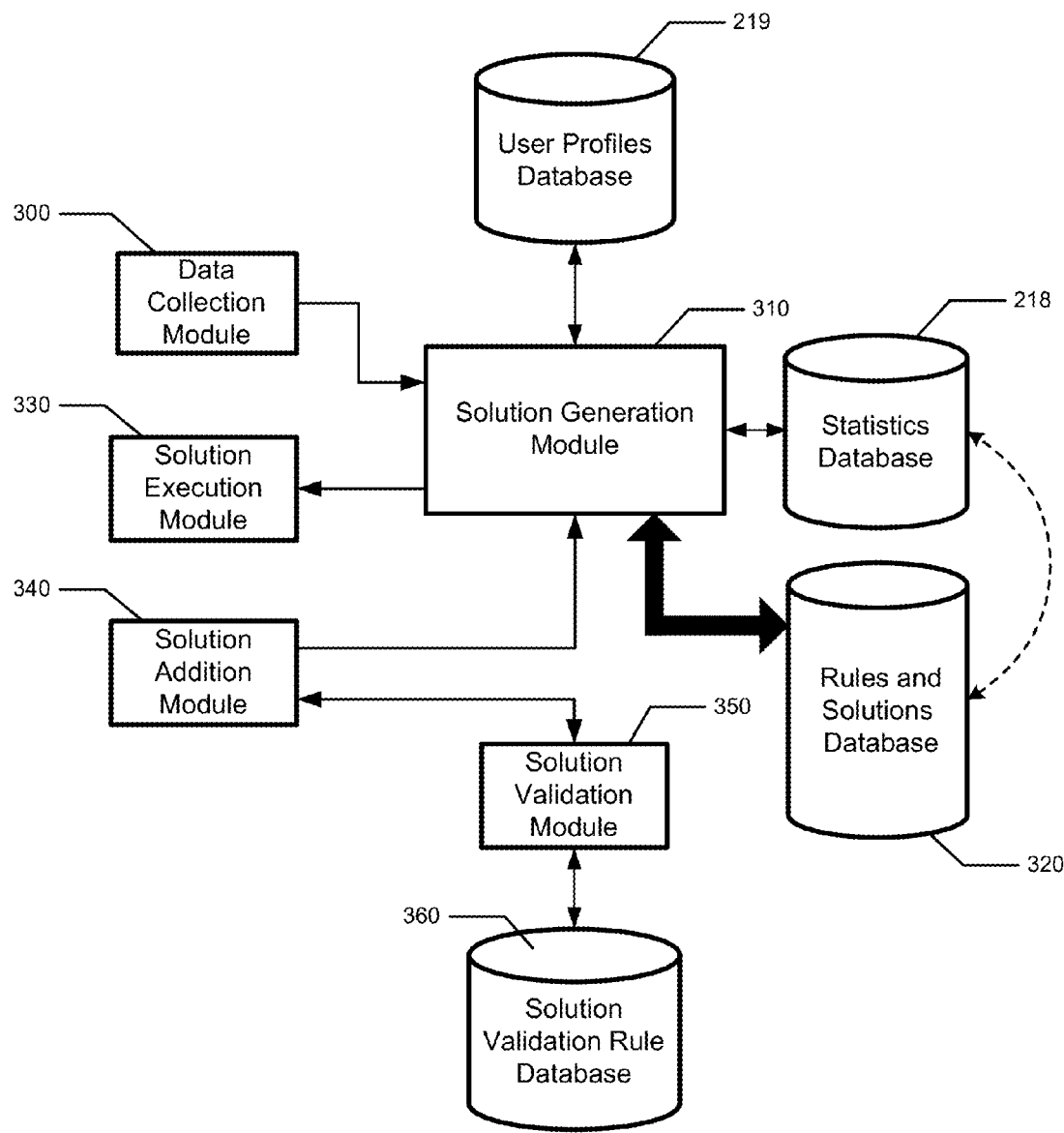
FIG. 3a illustrates a schematic of a systemic for generation of a solution for solving problems with computer functionality, in accordance with the exemplary embodiment.

FIG. 3 illustrates an architecture of an automated solution generation system, in accordance with the exemplary embodiment. In the event of system failures or other functionality-related problems, a data collection module 300 scans a user computer system. This scanning process involves collection of internal reports, logs, applications settings, as well as analysis of the applications and other resources installed on the computer system.

For example, the data collection module 300 acquires the following information about the system:
program version;
license data;
date of anti-virus database update;
error codes;
program execution reports;
user actions log;
system configuration data (software/hardware-related).

Collected data is provided to a solution generation module (i.e., decision-making tool) 310. The main task of the solution generation module 310 is to select the most efficient and productive solutions for the user system. In order to find an appropriate solution, the module 310 classifies a problem—identifies the category of the problem(s) based on certain parameters. For example, consider a case where the user has a problem with updating the antivirus databases. There are two possible causes—the license has expired, and the server is inaccessible. Each of these condition will at least point to a category of problems related to database updating. If there is a problem with curing an infected file, the data related to the problem will be written to a log of the AV software, where the category that would be determined is "problem with file cure".

Then, the module 310 forms a query and executes it on the solutions (and rules) database 320. The query execution provides selection of solutions for a particular problem (defined in the query) or for selection a category for problems. The solutions are assigned a special rating. After a particular solution has been applied, it is determined if this solution helped. The rating of the solution is increased or decreased based on verification and/or surveillance of the solution execution results in each instance.

The solution ratings are stored in a statistics database 218. Sorting the solutions based on ratings allows applying the most effective solutions for solving the computer system problems (or malfunctions) specifically formed for a particular user system. The selected solutions are applied by a solution execution module 330.

The execution module 330 can be implemented in a form of a compiler of machine readable instructions encapsulated in a script file. Alternatively, application of the solution can be implemented as execution of media files, such as audio, video, flash, etc. (or performing instructions provided in text files) or as downloading of an executable file, depending on how the solution is formed by the module 310. Also, the solution can include a link to update the software module that caused the error, or a link to a patch or to a media file that demonstrates to the user what he needs to do.

According to the exemplary embodiment, the solution database 320 can be updated by users or third party experts. The update can be implemented by a solution addition module 340. The solution addition module 340 creates solutions in a standard format. In order to prevent storing false solutions or potentially harmful solutions, a solution validation module 350 is used. The solution validation module 350 can validate solution using two approaches—validation of each particular action or file within the solution and emulation of the entire solution.

Validation rules are stored in a database 360. Each user is assigned a profile containing a set of identification data and parameters of a user system, a log (e.g., history of problems, applied solutions and resolved problems). The user profiles, advantageously, allow for customization and optimization of the fast user support system. The user profiles are stored in a user profiles database 219.

The main exemplary problem categories, for antivirus applications, are:
activation of an application is performed with error(s);
a malware object is detected and cannot be removed;
AV databases are out of data and cannot be updated;
the version of a software product installed on a user computer is not the latest;
problems with installation or removal of a software product;
vulnerabilities of installed software products are detected;
other problems occurring during execution of a software product(s).

Figure 4:
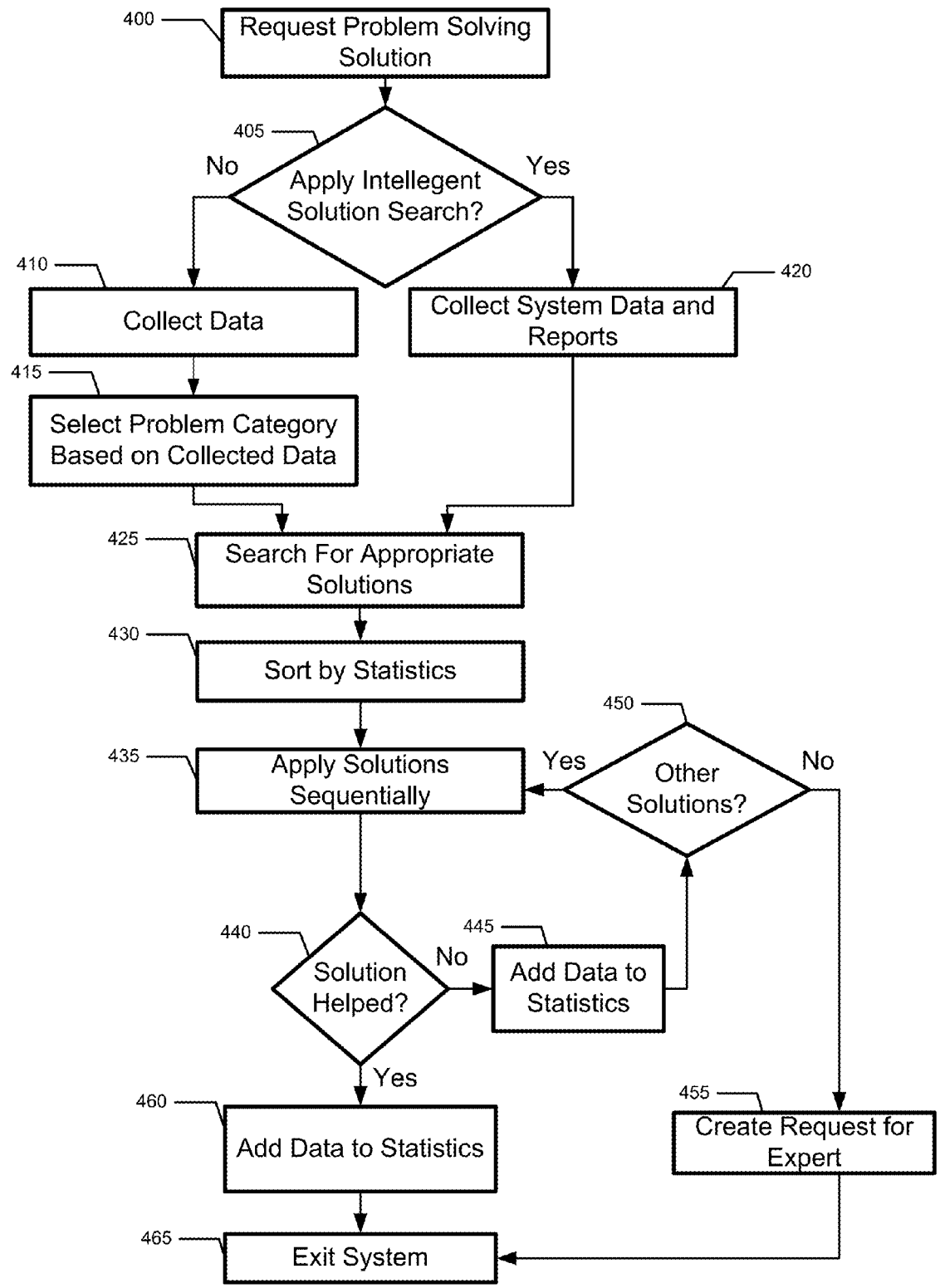
FIG. 4 illustrate a flow chart of a method for solution generation, in accordance with the exemplary embodiment.

FIG. 4 illustrates a flow chart of a method for solution generation, in accordance with the exemplary embodiment. A problem solving solution is requested in step 400. The problem solving request is generated automatically if system functionality parameters deviate from their normal values.

Alternatively, the request can be initiated by a user. If the intelligent search is selected in step 405, the system data and reports are collected in step 420. Based on this data a standard problem (i.e., a classified known problem stored in the support system) is automatically detected.

The automatic search does not always produce results and the system searches for solutions using problem categories. In this case, the data is collected in step 410. The problem category is selected in step 415 based on the data collected in step 410. Appropriate solutions are searched for in step 425 based on the data from steps 415 or 420. Each of the solutions has an assigned rating that is calculated based on statistical data. The solutions are sorted out by ratings in step 430.

Then, in step 435, the solutions are sequentially applied. If a solution with the highest rating does not solve the problem (see step 440), this data is added to the statistics in step 445. In other words, the rating of this solution is changed accordingly and, in step 450, the next solution is selected. If there are no solutions left, in step 450, a request for an expert is created in step 455 (and is recorded in the database as a problem that requires a solution) and the automated support process is terminated in step 465. The expert request contains the collected system data and solutions applied.

If in, in step 450, it is determined that other solution exists, the solution is applied in step 435. If, in step 440, it is determined that the solution has helped (i.e., resolved the problem), the solution data is added to the statistics in step 460 and the rating of the solution is increased. The automated support process is terminated in step 465.

Figure 5A:
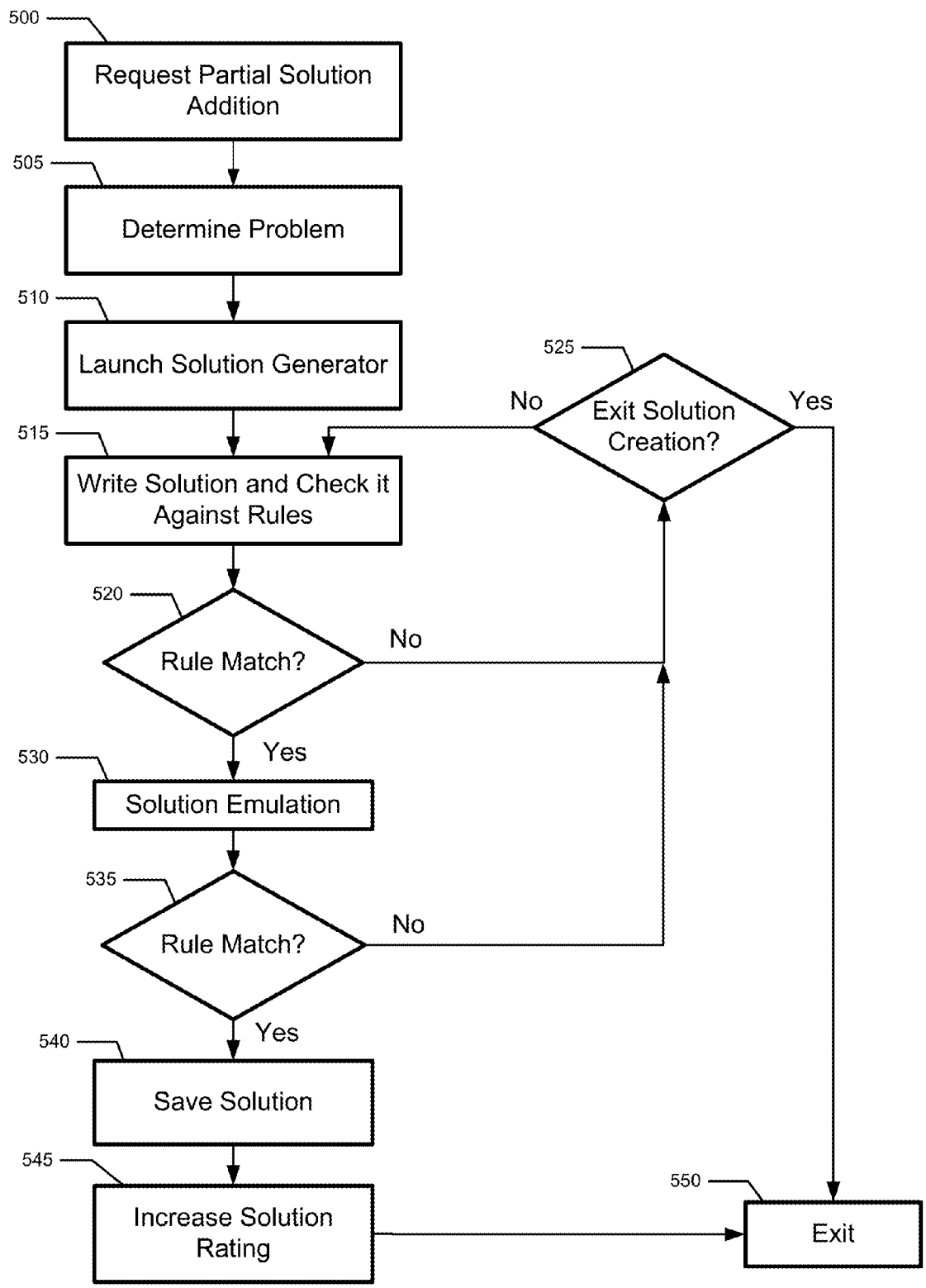
FIG. 5a illustrates a flow chart for adding a partial solution, in accordance with the exemplary embodiment.

FIG. 5a illustrates a flow chart for adding a partial solution, in accordance with the exemplary embodiment. Addition of a partial solution is requested in step 500. In order to determine rule format, a problem needs to be identified in step 505. The problem can be categorized based on the data received from the data collection module 300 (FIG. 3).

The solution generation module is launched in step 510. The solution is formed in step 515 in a form of a machine readable script, such as a macro. In order to make sure that a false or malicious solution is not applied, the solution is checked against the rules in step 520. If the solution does not check out against the rules in step 520, the solution is sent back for corrections in step 525. Examples of such rules might be access rights to files, directories, processes, system registry and other resources, etc. A standard against which the solution is measured is effectiveness and compatibility of the solution, installed applications and the hardware configuration. Alternatively, the solution can be discarded in step 525 and the process is terminated in step 550.

If the solution satisfies the rules in step 520, the solution is emulated in step 530 and the solution is checked against rules in step 535. If the solution matches the rules in step 535, the solution is saved in step 540. Thus, two separate rounds of checking the solutions are performed. The solution rating is increased in step 545 and the process is terminated in step 550.

As a result, a number of effective solutions increases and the speed of the automated user support increases as well. Solution addition requires saving user information in a format "user system data—a set of instructions for solving a problem."

An added solution contains a state of the system and instructions (i.e., solutions) for solving a problem created by the solution generator. This solution is a partial solution. The state of the system (i.e., of the user's computer) is represented by a set of system parameters and their respective values. A value of a particular parameter can be absent if a given parameter does not reflect a given system configuration. For example, if a user computer is not set for network access, a state of the network ports cannot be read.

Figure 6:
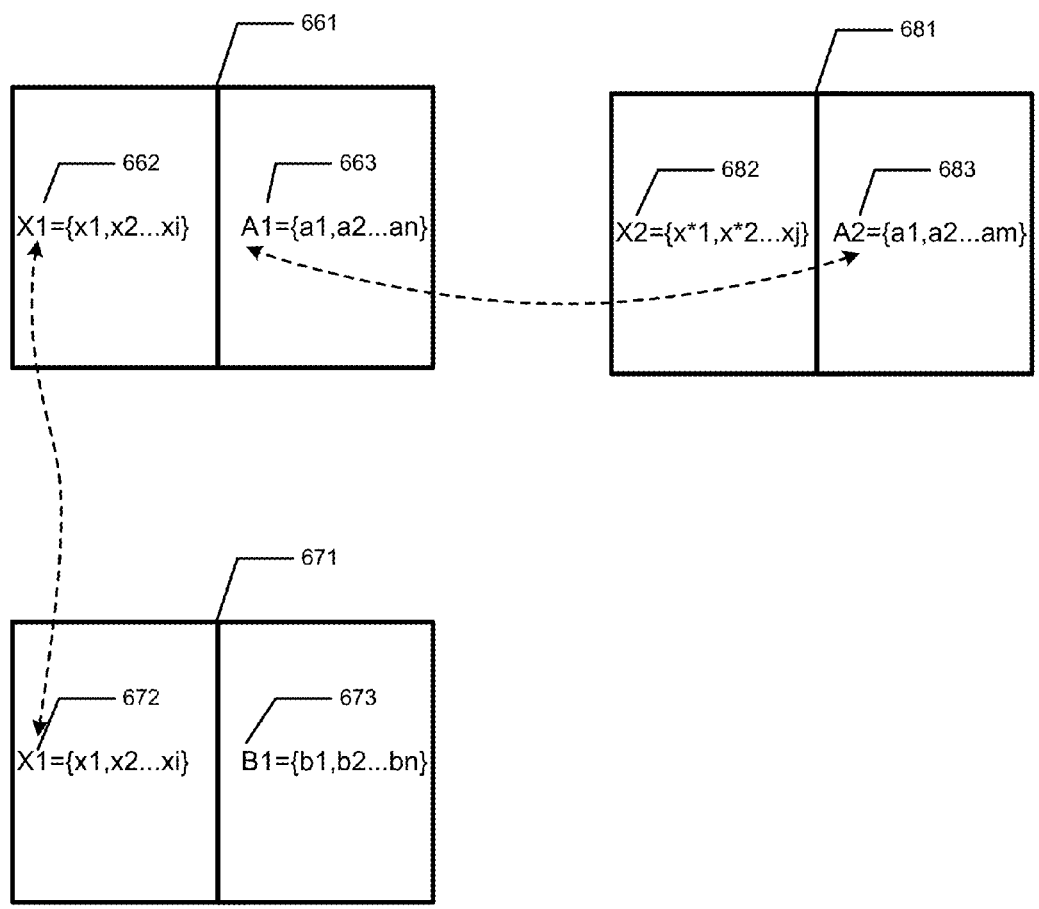
FIG. 6 illustrates exemplary partial solution sets with common system parameters and solution for solving problems.

A probability of an absolute coincidence of initial user data is extremely small. This makes a partial solution practically unusable. In order to transform a partial solution into a common (i.e., final) solution that can be effectively used in various user systems, an algorithm depicted in FIG. 6 is applied. Partial solutions 661, 671 and 681 are stored in a database. These solutions consist of system parameters (X) 662, 672 and 682 and sets of instructions (A1, A2, B1)—663, 673, 683.

Collected partial solutions are compared to each other and combined into a common solution using a rule, according to which the common solution corresponds to a particular problem. According to the exemplary embodiment, comparison of the partial solutions can be implemented using known methods, such as, for example checksums. A result of comparison is a value reflecting a degree of coincidence of two sets of parameters or two sets of instructions. Threshold values for the degree of coincident are set by experts in the process of educating the system, by identifying correct and incorrect solutions, specifying cause-effect relationships and control values of parameters that characterize the problem and the solution. The sets are considered to be equal if the degree of coincident exceeds the threshold.

To convert a partial solution to a solution that can be used effectively in multiple user systems (i.e., a general solution), the algorithm shown in FIG. 5a is used. The database collects partial solutions for users 561, 571, 581. These include system parameters 562, 572, 582 and a set of instructions A and B, which in FIG. 5a are labeled 563, 573, 583. The collected partial solutions are compared to each other, and a general solution and a rule for its application can be generated. The comparison can use any number of mechanisms, such as, e.g., control sums. The result of the comparison is a quantitative measure that is characterizes the degree of similarity of two sets of parameters or two sets of instructions. The threshold for comparison, when the two sets are considered similar, is normally defined by an expert.

According to the exemplary embodiment, two cases of correlation of partial solution are possible. In one case, sets of instructions of partial solutions are considered equal. In this case system parameters corresponding to the partial solutions are compared. The parameters that are absent (i.e., not set) are ignored. As a result of comparison, a rule defining relations between system parameters is formed. This rule is an intersection of the two sets of the parameters and sets of instruction of the partial solutions.

This rule is stored in the solutions (and rules) database. For example, one system has a parameter set $X1=\{x1,x2,x3,x4\}$ and another system has a parameter set $X2=\{x1,x2,x3,x4,x5\}$. Both systems have equal sets of instructions A1=A2 that solve problems in X1 and X2 respectively. Then, the following resulting rule is formed:

IF [$X=\{x1,x2,x3,x4\}$] THEN [A1,A2], where [A1,A2] a list of solutions consisting of solutions A1 and A2.

In another possible case, parameter sets are also considered to be equal. In this case, a rule needs to define the connection between a set of parameters (with all additions) and each set of instructions of the partial solutions. The set of parameters with additions is a set where differing parameters are added to the list. Thus, a given parameter has two or more values depending on a number of the parameter values in the initial set.

For example, $X1=\{x1,x2,x3,x4\}$ and $X2=\{x1,x2,x3,x4'\}$, where x1-x4,x4'—are set system parameters, and A1≠A2, where A1 and A2 are differing sets of instructions that solve problems of X1 and X2 respectively. Then, the following rule is formed:

IF [$X=\{x1,x2,x3,x4$ or $x4'\}$] THEN [A1,A2], where [A1, A2] a list of solutions consisting of solutions A1 and A2.

When a number of system parameter values in the rule becomes relatively large (at least two, but in most practical cases, at least 3-4), the parameter set can be extrapolated into a function. This can assist in preventing some potential problems, reduce a number of rules and simplify storage of data. For example, consider a case with several events of the same nature, but with different parameters: a conflict between an antivirus software and an application version 1.1, a conflict between an antivirus software and an application version 1.2, and a conflict between an antivirus software and an application version 1.3. It can be assumed that there would be a conflict with version 1.4 as well, therefore, the solution needs to take this into account in advance.

Figure 7:
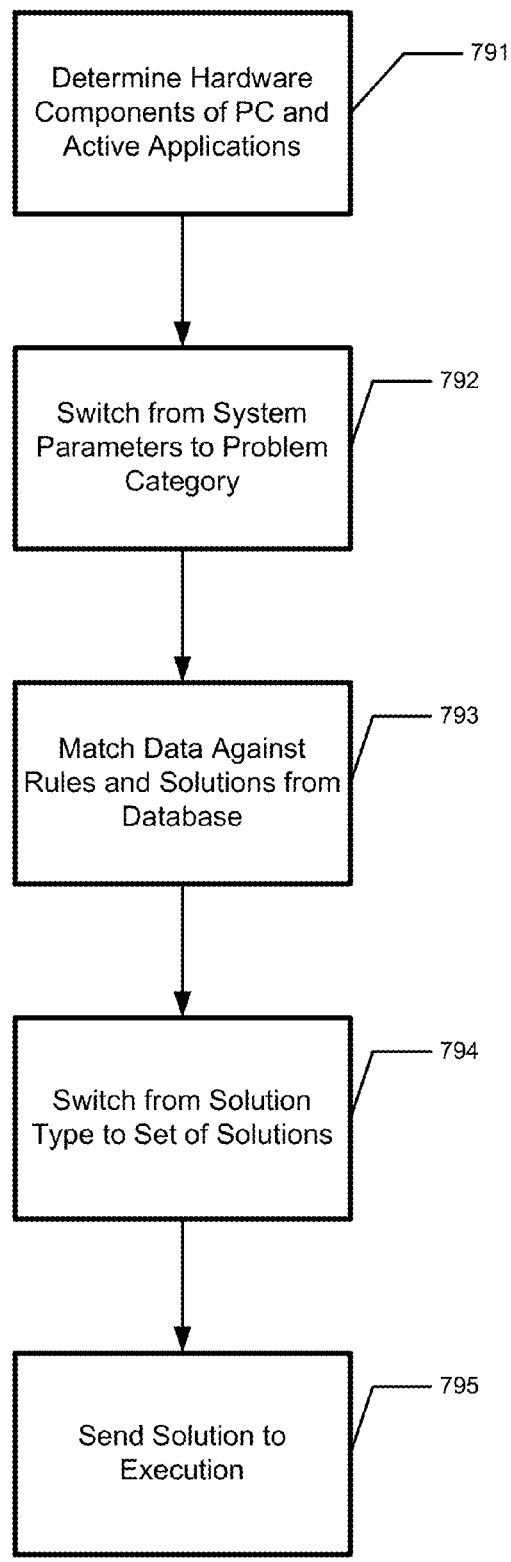
FIG. 7 illustrates a flow chart of a method for finding solutions using fuzzy logic, in accordance with the exemplary embodiment.

FIG. 7 illustrates a flow chart of a method for finding solutions using fuzzy logic, in accordance with the exemplary embodiment. This algorithm determines the rules for solving the problems in a user computer system. In step 791, the data collection module 300 (FIG. 3) collects data related to a user system. This data can include OS data, software/hardware configurations, application reports, etc.

In step 792, particular system parameters are transformed into common (i.e., inexact) linguistic terms or variables. This process is performed by classification of problems and separating them into categories. For example, for a set of parameter values some corresponding terms are assigned. If application parameter is "last application update" with values "3 days ago" and "1 week ago." The corresponding terms are "recently" and "long time ago." Then, a class of problems is "updating problems."

If an exemplary parameter is "CPU load by process" with values "10%, 50%, 90%". The corresponding terms are "low load", "medium load" and "high load", respectively. The exemplary corresponding problem classes are "application conflicts" and "treating viruses".

In step 793, fuzzy rules from the rule and solution database 320 (FIG. 3) are matched with fuzzy variables. As a result of such matching, a rule corresponding to a fuzzy variable is found. Such rule contains a reference to a set of solutions or to a parameter (in a form of a metadata) defining each solution. Thus, in step 793, a type of the solution for solving the existing problem according to the given rule is determined.

In order to switch to exact variables, in step 794, the solutions of a given type are found in the rule database. Then, in step 795, the found solutions are sent to the user's computer for execution. The transmission can be using HTTP or other protocols, or using an agent on the client side, etc. The solution is implemented on the user's side.

Figure 8:
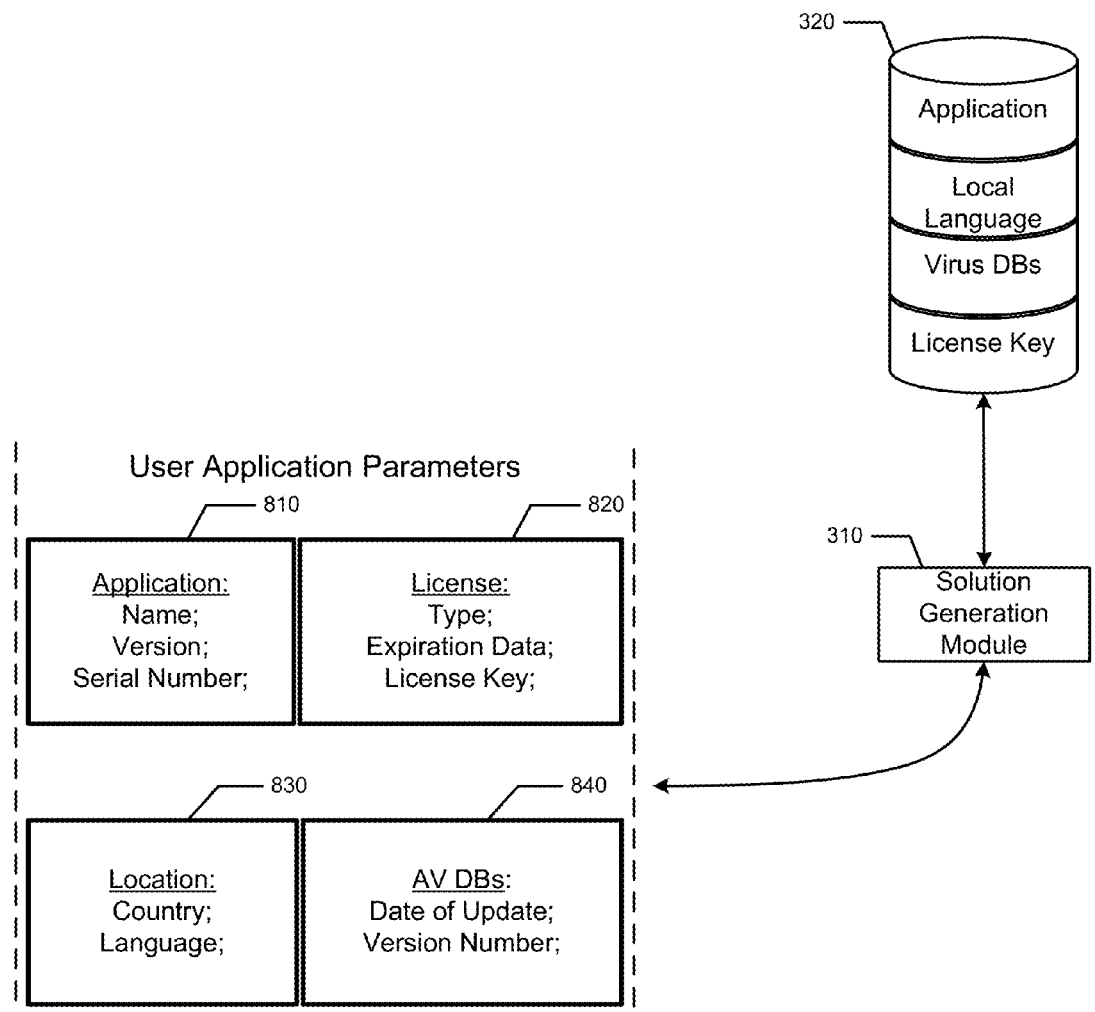
FIG. 8 illustrates mechanism of selection of rules and solutions from a database based on user profile, in accordance with the exemplary embodiment.

FIG. 8 illustrates mechanism of selection of rules and solutions from a database based on user profile, in accordance with the exemplary embodiment. The data collection module 300 (FIG. 3) scans the user system and determines system parameters, such as: application 810 name, version and serial number; license 820 type, expiration date, license key; location 830—country and local language; AV database 840—update date and version number.

The solution generation module 310 selects rules and solutions from the database 320 based on collected data (i.e., parameters). As a result, if the user has an AV application of N-version (with current AV DBs and an active license key) installed, the solution generation module 310 will suggest a special solution for this N-version of the AV application. Other solution for unlicensed versions with outdated AV database(s) will be automatically excluded from consideration.

Figure 9:
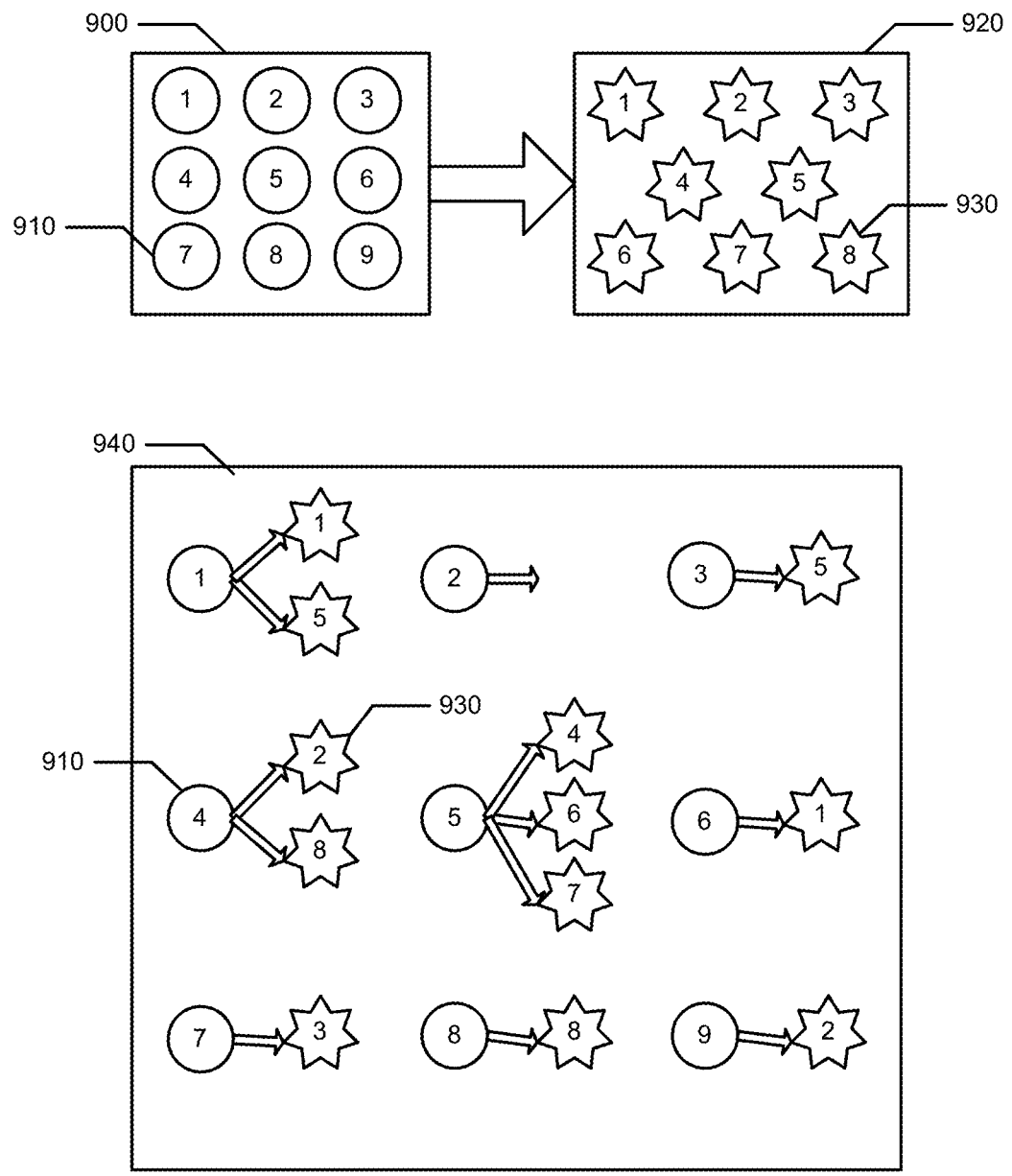
FIG. 9 illustrates exemplary correlation of problems and solutions based on logical rules.

FIG. 9 illustrates exemplary correlation of problems and solutions based on logical rules. The database 320 (FIG. 3) stores records related to problems 900. These problems are separated into classes (categories) 910 and solutions 920. The database 320 also stores rules 740, according to which for each category of problems 910 several corresponding solutions 930 are found.

The number of solutions for one category 910 can be arbitrary limited by memory capacity. A solution can correspond to several problems (i.e., several problems can be solved by the same solution). For example, in FIG. 9 the rule defines that solution "1" can solve problems "1" and "6." However, the rule does not find a solution for problem category "2", while for category "5" three potential solutions are found.

Figure 5B:
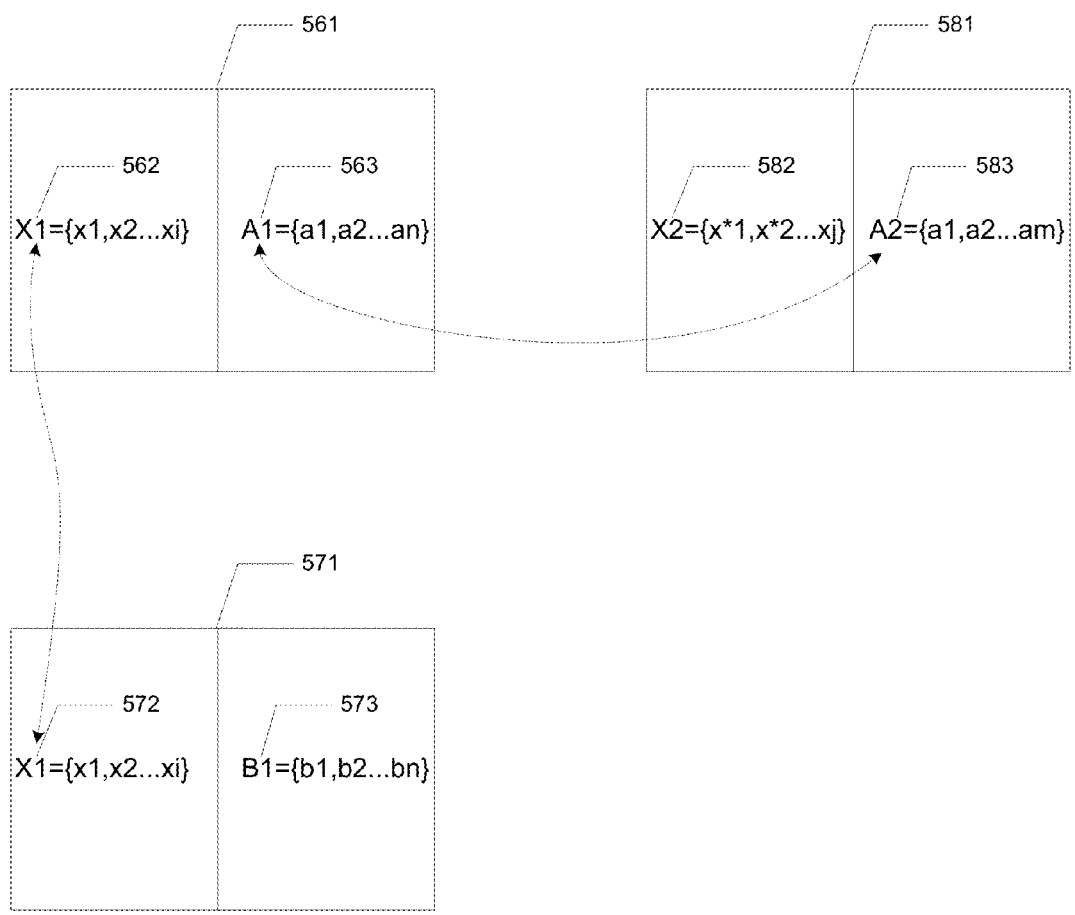
FIG. 5b illustrates a conversion of a partial solution to a general solution.

The rules for forming solutions are created by an expert (either specific solutions generated by a human expert with assistance from the module, or general solutions created by the analyzer based on combining, adding to or determining an intersection between various specific solutions). Creation of rules for each problem results in a large number of rules and memory overload. According to the exemplary embodiment, this problem is solved by employing a fuzzy logic algorithm. This approach allows for generation of new rules and solutions based on partial solutions received from a user. This process is depicted in FIG. 5.

Figure 10A:
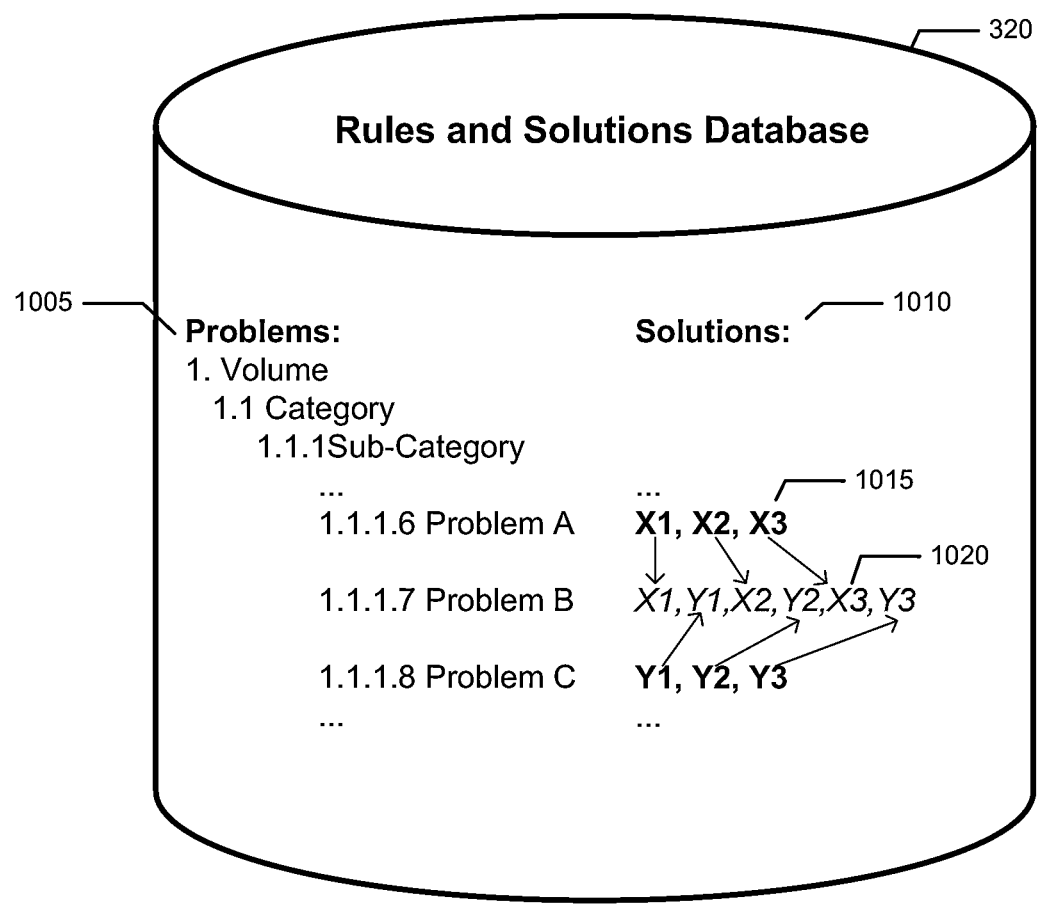
FIG. 10a illustrates forming a solution for a new problem in a sub-category, in accordance with the exemplary embodiment.

Another implementation of finding a solution is shown in FIG. 10a, illustrating creation of a solution for a new problem in a sub-category, in accordance with the exemplary embodiment. The database of rules and solutions 320 that has problems 1005 separated into categories, sub-categories and volumes. Each problem has a corresponding set of solutions 1010. In case if a problem has no solution in the database, it is assumed that similar problems can have the same solutions.

For example, "problem B" is in the same sub-category with "problem A" and "problem C." The corresponding rules define the sets of solutions 1015: {X1,X2,X3} for "problem A"; {Y1,Y2,Y3} for "problem C" and an empty set for "problem B." In this case, a set of solutions 1020 for "problem B" is generated. This set of solutions contains the solutions for solving problems of its sub-category. As a result, the following rule is formed:

IF ["B"] THEN [X1,Y1,X2,Y2,X3,Y3]

In this example, the solutions for problems "A" and "B" alternate. However, an order of the solutions can be set according to rating of the solutions, their complexity, etc.

A user can have very complex problems that cannot be classified definitively. These complex problems are divided into several simple ones that are solved sequentially. Examples of complex problems can be the following:

AV processing requires update of AV database(s);

AV application cannot run due to corrupted signature databases and AV application has to be re-installed or a latest version has to be installed. These solutions can be implemented in parallel mode or sequentially;

An application does not launch and other conflicting applications have to be removed from the system. AV processing needs to be performed and the application needs to be update to the latest version.

Figure 11:
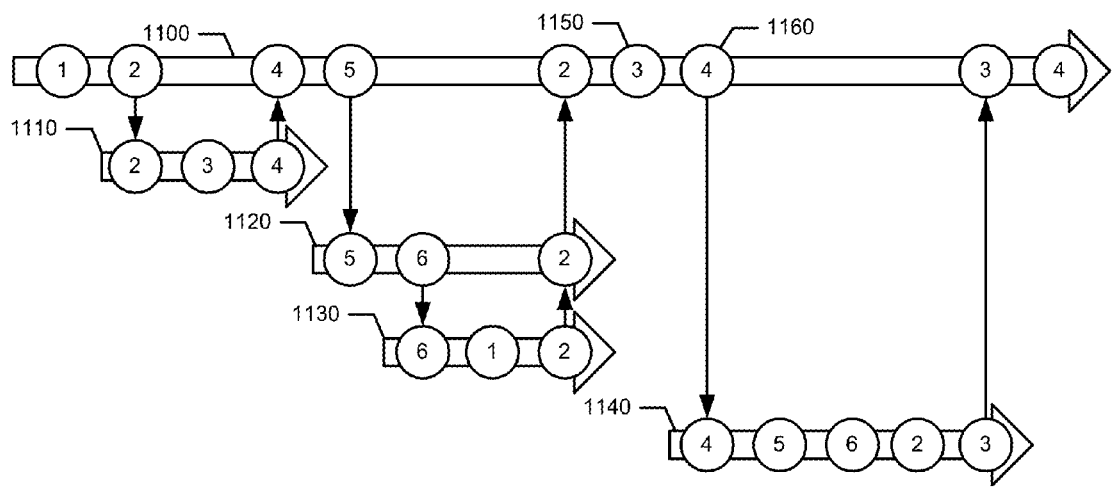
FIG. 11 illustrates solution sequence for complex problems using embedded solution chains, in accordance with the exemplary embodiment.

Solving complex problems is shown in FIG. 11, illustrating using solution sequence for complex problems by employing embedded solution chains, in accordance with the exemplary embodiment. A chain of solutions 1100 of a problem "A" consists of separate solutions 1150 positioned based on rating. During application of these solutions, solving embedded problem "B" becomes necessary.

A chain of embedded solutions 1110, 1120, 1130, 1140 is also sorted out by rating. After solving the embedded problems, the process returns to the next (in order) step of solving of the problem "A." A number of embedded solutions is defined by a number of sub-categories of a problem and by a number of known saved rules.

A solution, in accordance to the exemplary embodiment, is a set of actions (and related data) that can be used to prevent and/or solve a malfunction in a computer system. The solutions can be in a form of: text files, media files (i.e., audio, video, animation, etc.), application "patches", configuration files, scripts, etc.

Each type of solution can complement or replace other solutions. For example, solving the problem requires execution of the script. However, in order to prevent reoccurrence of the problem, a "patch" needs to be installed. Most commonly the text files are used for the solutions. These files can be easily accessed and edited. However, text files (i.e., documents) or media files cannot be used automatically.

An automatic way of solving the problems is application of "patches" that update, complement or correct applications or OSs. Corrections are created by experts and stored in the solution database. Another automated type of solutions are executable scripts written in machine code. The script instructions can be executed without any user input.

Implementation of script-based solutions can be difficult due to lack of some functionality in some of system components and non existence of a control interface. Configuration files can change system settings, but have similar problems as the scripts. Storing and applying system configurations can increase effectiveness of operation support service. Use of some customization is required. In order for the solutions to be the most effective, the rules that take into account the parameters of user systems need to be applied in selection of the solution.

The parameters are acquired from a user computer system. Application of the parameters provides for appropriate customization (i.e., individualization of the solutions). Functionality of the automated support system can be complemented by the following data:

User history logs (detected problems, effective solutions, added solutions, application settings, etc.);

Determination of user competency level and providing solutions based on the user level (i.e., beginner, advanced and expert, for example, selected by the user, or selected by default as beginner, or selected based on other settings—for example, if the settings are fairly specific and unusual, then presumably the user is an expert);

User rating (i.e., users are rated by a number and quality of added solutions and by frequency of use of the support service).

For example, for a beginner level a simple user solution data is provided. The solution presents a detailed sequence of user actions required. For an advanced level user, medium complexity data is provided. The solution contains system configurations and a sequence of user actions required. For an expert level user, a complex data can be provided. The solution contains specific system settings.

Generally, the sequence of events is as follows: (1) an event occurs (if the event is known, the error code is recorded), and each action by the system is recorded in a log; (2) based on the logs, it is possible to determine whether the error code was due to a conflict between applications, or due to an internal error within an application or a user error (incorrect settings, incorrect actions, such as permitting a malicious file to execute); (3) compare parameters to determine (2), e.g., parameter 1=condition 1, parameter 2=condition 2, parameter 3>threshold 3; (4) apply solution, based on personalization, rating, etc., (5) add new solution and its verification.

Figure 10B:
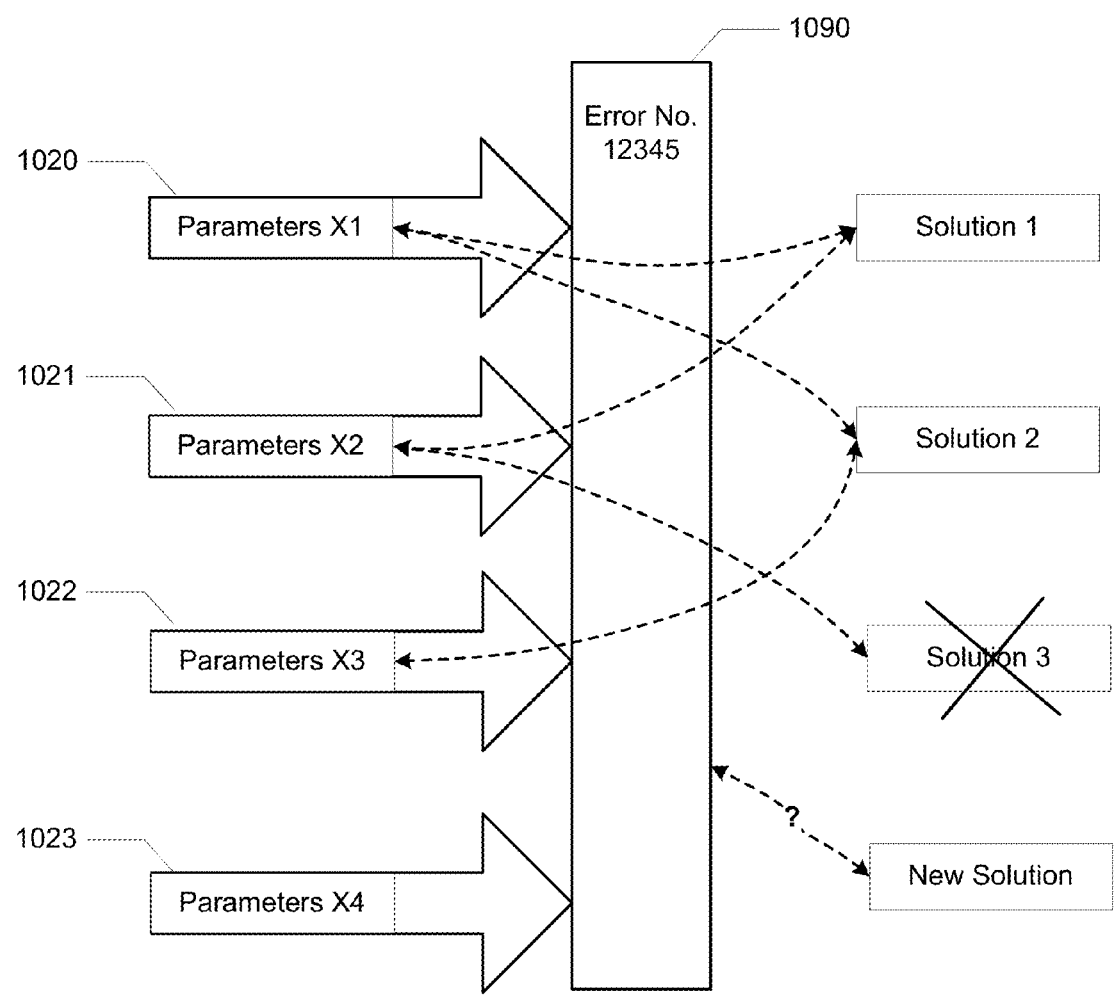
FIG. 10b illustrates the solutions that correct a particular error and parameters that are related to this process.

Generally, the actions of the system can be organized in to the following sequence: (a) an event is detected, and if possible, the event is identified, and the error code is also identified, as well as the class of the problem, etc.; (b) the actions of the system are written to a journal, which is analyzed to further identify the error, the system failure, any events that preceded the failure, any events indicative of a conflict of applications, incorrect actions by an application, such as permitting malware-infective code to run, turning off security software, etc.; (c) use of fuzzy logic to determine system parameters and possible solutions; (d) applying the solutions, taking into account the rating and the personalization factors; (e) adding a new solution and its verification. FIG. 10b illustrates the solutions that correct error No. 12345: solution 1, solution 2, and solution 3. As described earlier, the number of the error is used to categorize the problem. Based on the error, the system can determine what happened to the user's computer—for example, a file cannot be cured, memory cannot be read or written to, an error in the application, etc. Also, the system parameters that were in effect when the error occurred are also stored—in this example, parameters X1-X4. FIG. 10b also shows the connection between the parameters and the solution, which permit determining an effective correction of the problem for the particular set of system parameters. Dashed lines set the rules: the connection between the parameters and the errors might not be so unequivocal. It is possible that in a particular case, no solution is possible (short of a complete system reinstalled). For example, error No. 12345, which occurred in the user's computer system with parameters X4, at this moment cannot be corrected by using the defined connections. On the other hand, the error in the system with parameters X2 can be corrected using two different solutions. In the example, out the three known solutions, two can be used to cure the error. Therefore, by comparing their ratings, one of them, for example, solution 3, can be removed.

FIG. 10b also illustrates a newly added solution. This solution can be added to the database by an expert, or can be generated using the algorithms described above. The new solution can be a combination of several existence solutions (mathematically, a union), an intersection of existing solutions, a modification of existing solutions, etc. Such a procedure can be used to increase the effectiveness of the solution also, in this case, it is known that the solution can address error No. 12345, however, in order to determine the rating of the solution, its effectiveness on different computer systems with different system parameters needs to be tested. The testing can be performed automatically on computer systems with various users, or it can be performed in a virtual environment, or different sets of system parameters are modeled. For example, these can be different versions of the operating system, processor versions, user applications, network interfaces, and so on. After the testing results are received, the new solution can be compared to other existing solutions, as well as their metadata as it relates to solution effectiveness and applicability of the solution. For example, if the new solution corrects error No. 12345 for all cases X1-X4, and at the same time is less resource intensive, compared to other solutions, then its rating will be the highest, and it will be the first one to be used.

Figure 3B:
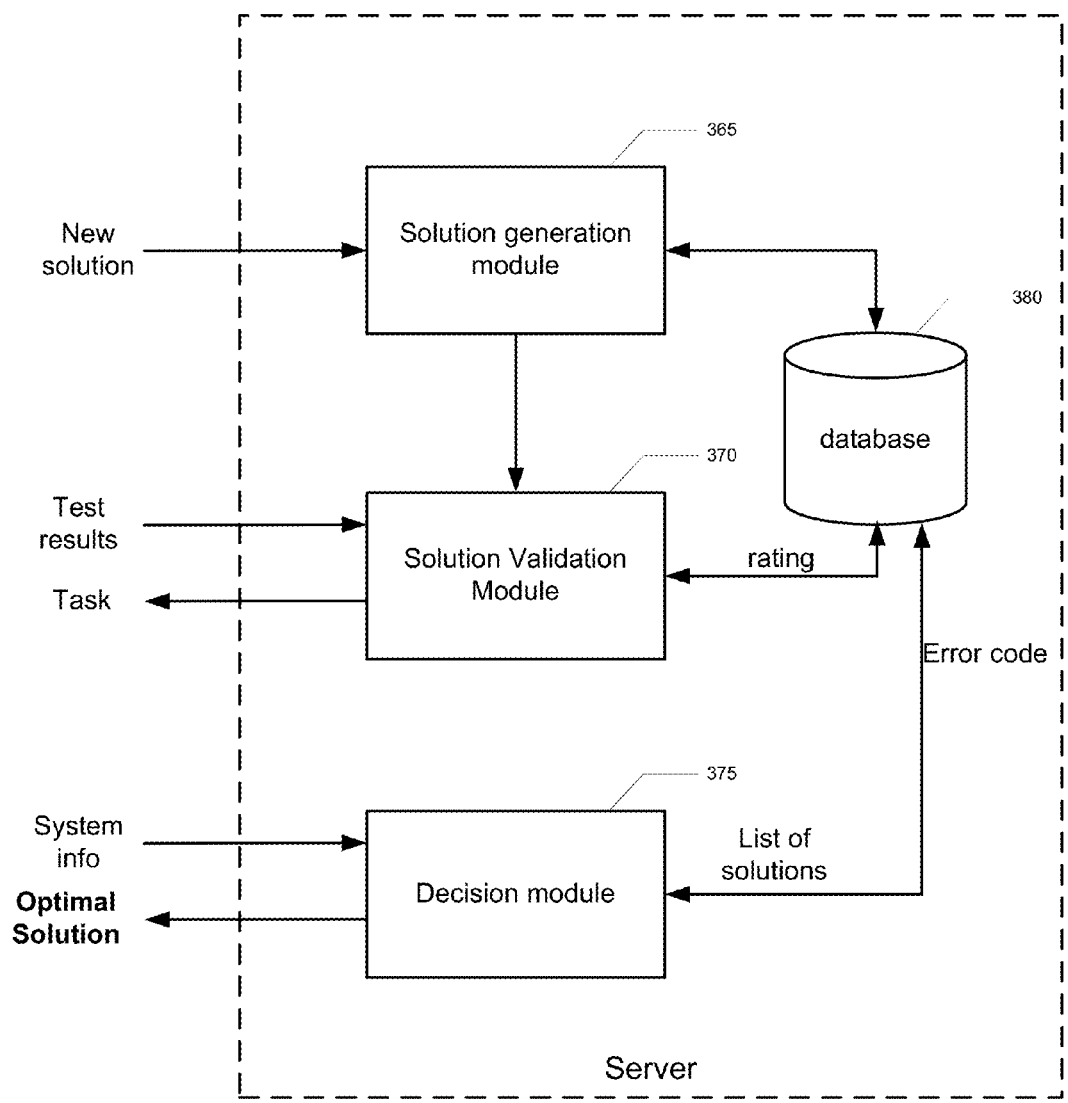
FIG. 3b illustrates a schematic of a server on which the system can be implemented.

FIG. 3b shows a general schematic of a server on which the system described herein can be implemented. As shown in this figure, of the database 380 contains the solutions, their metadata, the rules based on which the solutions are chosen to correct the specific errors and functionality problems. The server permits updating the database by generating new rules and by optimizing existing rules, testing the solution to determine compatibility of the particular solution and specific different parameters, such as software and hardware configurations of the user's computer system, and determining the rating for new solutions. The server also permits forming a sequence of decisions, sorted by rating and personalized based on user profiles, in response to the collected system information.

The means for generation of new rules processes the solution created by the expert, conducts a search of similar solutions and of solutions for the particular problem category (i.e., for this error and for similar errors), after which it compares the data of the solutions based on the rating, the compatibility, etc., and analyzes the redundancy of any solutions. Based on this information, the initial rating level for the new solution is generated. New solutions go through a stage of testing, to determine their compatibility and effectiveness on computers with different system parameters and settings. Collectively, compatibility, effectiveness, rating and optionally other characteristics represent the quality of the solution. The means in question can be implemented using various mechanisms, such as, for example, a set of virtual machines with different characteristics. If the error can be corrected in a particular virtual machine, then the solution is considered to be compatible with the parameters and settings of that virtual machine. The greater the number of sets of system parameters with which the solution is compatible, the greater the effectiveness of the solution. Additionally, resource consumption required by the solution can also be analyzed, such as time required to implement the solution, memory required, computational resources required, etc. The results of the testing affect the rating of the solution—the greater the effectiveness and the lower the resource consumption, the higher the rating. Optionally, the testing can be conducted on the user's side. In the event of an error, a new solution can be sent to the user after which the results are returned from the user, are processed, and are stored in a database.

Figure 12:
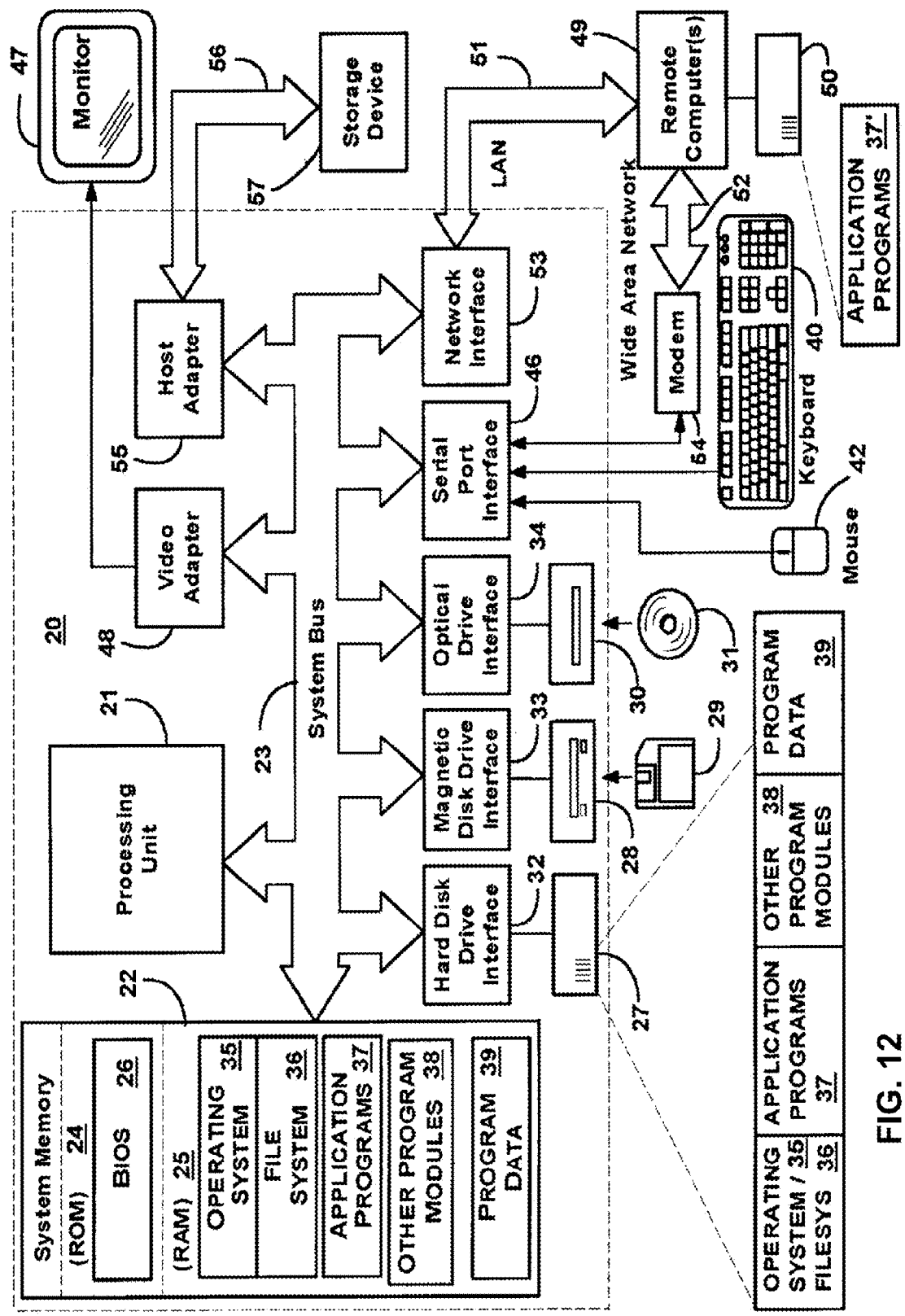
FIG. 12 illustrates a schematic of an exemplary computer system that can be used for implementation of the invention.

With reference to FIG. 12, an exemplary system for implementing the invention includes a general purpose computing device in the form of a computer or server 20 or the like, including a processing unit 21, a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for an effective automatic detection and correction of operation-related computer problems or malfunctions.

It should also be appreciated that various modifications, adaptations and alternative embodiments thereof may be made within the scope and spirit of the present invention. The invention is further defined by the following claims.

What is claimed is:

1. A system for automated support of a computer system, the system comprising:
    a processor;
    a memory coupled to the processor and containing code for:
    a data collection module for collecting data from a user computer system;
    a solution generation module connected to the data collection module for receiving collected data from the data collection module;
    a database of solutions and rules accessible by the solution generation module;
    a solution addition module connected to the solution generation module for forming a partial solution;
    a solution validation database for storing solution validation rules;
    a solution validation module for receiving the partial solution from the solution addition module and for validating the partial solution against the solution validation database;
    a solution execution module connected to the solution generation module for executing the solutions on the user computer system, wherein:
    the solution generation module selects a solution from the rules and solutions database based on a user profile data,
    wherein the user profile data is stored in a user profiles database;
    the solution generation module forms a solution based on the partial solution and statistics data.

2. The system of claim 1, wherein the statistics data is acquired from a statistics database containing solution ratings.

3. The system of claim 1, wherein the data collected from the user computer system comprises:
- hardware configuration data;
- software setting data;
- user logs;
- application reports;
- error reports;
- CPU state data;
- operating memory state; and
- network ports states.

4. The system of claim 1, wherein the solution generation module determines parameter values of the user computer system.

5. The system of claim 4, wherein the solution generation module compares the parameter values against known problems stored in the solution database.

6. The system of claim 5, wherein the known problems are defined by a set of parameters of the user system.

7. The system of claim 1, wherein the solution generation module forms new solutions and rules based on a user competency level.

8. The system of claim 1, wherein the solution generation module employs fuzzy logic algorithms for generating new solutions.

9. The system of claim 1, wherein the solution generation module employs statistics-based methods for generating new solutions.

10. The system of claim 1, wherein the solution generation module forms new solutions based on solutions provided by an expert according to a user competency level.

11. The system of claim 1, wherein the solution ratings are calculated based on effectiveness of the solutions, wherein the effectiveness is measured by a number of problems successfully solved by the solution.

12. The system of claim 1, wherein the solution is any of:
- a script file;
- an executable file;
- a media file; and
- a text file.

13. The system of claim 1, wherein the user profiles database comprises:
- a user competence level data;
- a user application data;
- a data reflecting existing problems;
- a data reflecting solved problems; and
- an applied solutions-related data.

14. The system of claim 1, wherein the solution validation rule database comprises solution addition rules.

15. The system of claim 14, wherein the solution addition rules include list of allowed and disallowed instructions.

16. The system of claim 1, wherein the solution addition module provides the partial solution to the solution generation module, if the solution validation module does not produce errors or detects disallowed instruction within the partial solution.

17. A computer-implemented method for automated support of a computer system, the method comprising:
- collecting data from a user computer system;
- determining parameter values of the user computer system based on the data;
- defining a user profile based on the data;
- selecting a solution from a database based on the user profile and the parameter values;
- forming a partial solution;
- defining solution addition rules;
- validating the partial solution against the solution addition rules;
- forming a final solution by adding the partial solution to the solution, if the partial solution is validated;
- executing the final solution on the user computer system;
- analyzing the final solution execution results;
- assigning rating to the final solution based on the execution results; and
- storing the final solution.

18. The method of claim 17, wherein the selecting of the solution from the database is performed by comparing the parameter values against parameter values of known problems.

19. The method of claim 17, wherein the user profiles comprises:
- a user competence level data;
- a user application data;
- a data reflecting existing problems;
- a data reflecting solved problems; and
- an applied solutions-related data.

20. The method of claim 17, wherein the final solution is any of:
- a script file;
- an executable file;
- a media file; and
- a text file.

21. A system for automated support of a computer system, the system comprising:
- a processor;
- a memory coupled to the processor; and
- a computer program logic stored in the memory and executed on the processor, the computer program logic for implementing the steps of claim 17.

22. A system for automated support of a computer system, the system comprising:
- a server-side processor;
- a memory coupled to the processor;
- computer code loaded into the memory for:
  (a) a solution generation module for (i) generation and storing in a database of a solution for a category of user computer problems, (ii) finding a solution for the problem category in the database, and (iii) comparison of the solution with other solutions in the database based on a quality metric of the solution,
  wherein the solution generation module is connected to a solution validation module for testing the solution, and
  wherein the solution generation module is connected to the database, the database containing the solutions and rules;
  (b) the solution validation module connected to the database and adapted to test the solution for different software and hardware configurations to determine the quality metric of the solution and to store the quality metric in the database; and
  (c) the database containing the categories, the solutions, the quality metrics and the rules that determine which solution corresponds to which category of problems,
  wherein the quality metrics include ratings of the solutions that are based on how many different problems a particular solution can be applied to.

23. The system of claim 22, further comprising a solution decision making module adapted to (i) collect configuration information from at least one user computer, the configuration information used to determine the problem category, (ii) generate a list of solutions, from the database, that correspond to the problem category and the user's configuration information, wherein the list is ordered based on the ratings of the solutions, (iii) transmit at least some of the solutions on the list to the user's computer.

24. The system of claim 22, wherein the database includes user profiles, the user profiles including the configuration information, problems that the user's computer has experienced in the past, solutions used on the user's computer and solutions added by the user.

25. The system of claim 23, wherein the solution decision making module also loads the user profile from the database and forms the list of solutions based on the loaded user profile.

26. The system of claim 22, wherein the user profile further includes the following information from the user's computer: an event log, an applications log, an error log, processor state and network device state.

27. The system of claim 22, wherein the solution validation means comprises a plurality of virtual machines with different software and hardware configurations.

28. The system of claim 22, wherein the solution validation means executes on the user's computer and tests the solution on the hardware and software configuration of the user's computer.

29. The system of claim 22, wherein the quality metric includes a rating of the solution and an effectiveness of the solution.

\* \* \* \* \*